United States Patent
Jackson et al.

(10) Patent No.: US 8,713,903 B2
(45) Date of Patent: May 6, 2014

(54) BRAKE ASSEMBLY FOR POWER EQUIPMENT

(75) Inventors: Gordon W Jackson, Clayton, NC (US); William R. Best, Benson, NC (US); Harold E. Mills, Raleigh, NC (US)

(73) Assignee: GXi Holdings, LLC, Clayton, NC (US)

( * ) Notice: Subject to any disclaimer, the term of this patent is extended or adjusted under 35 U.S.C. 154(b) by 152 days.

(21) Appl. No.: 12/728,433

(22) Filed: Mar. 22, 2010

(65) Prior Publication Data

US 2011/0083412 A1 Apr. 14, 2011

Related U.S. Application Data

(60) Provisional application No. 61/251,272, filed on Oct. 13, 2009.

(51) Int. Cl.
*A01D 69/10* (2006.01)

(52) U.S. Cl.
USPC .......................................................... 56/11.3

(58) Field of Classification Search
USPC .................. 56/11.3; 188/73.1, 7.1, 72.3, 166; 474/171, 5
See application file for complete search history.

(56) References Cited

U.S. PATENT DOCUMENTS

| | | | |
|---|---|---|---|
| 3,570,637 A * | 3/1971 | Pitman et al. | 192/224.1 |
| 4,127,980 A * | 12/1978 | Ferguson | 56/11.3 |
| 4,307,558 A * | 12/1981 | Bent et al. | 56/11.3 |
| 4,322,935 A * | 4/1982 | Poehlman | 56/11.3 |
| 4,454,706 A * | 6/1984 | Geeck, III | 56/11.3 |
| 4,721,494 A * | 1/1988 | Hayashi et al. | 474/88 |
| 5,004,497 A * | 4/1991 | Shibata et al. | 75/229 |
| 6,021,630 A * | 2/2000 | Higashi et al. | 56/11.3 |
| 6,095,294 A * | 8/2000 | McGourthy et al. | 188/166 |
| 6,464,055 B1 | 10/2002 | Wians | |
| 7,278,519 B2 * | 10/2007 | Iwai et al. | 188/1.11 W |
| 2006/0144655 A1 * | 7/2006 | Lin | 188/251 A |

OTHER PUBLICATIONS

ANSI B71.4-2004 Commercial Turf Care Equipment—Safety Specifications, Standards Store, May 17, 2011.

* cited by examiner

*Primary Examiner* — Alicia Torres
(74) *Attorney, Agent, or Firm* — James G. Passe; Passe Intellectual Property, LLC

(57) ABSTRACT

A braking system stopping the rotational movement of a spindles used in power equipment may have brake pads that engage the spindle. The braking system has a brake arm that pivots at one end and has a brake pad at the other end. The brake arm is connected to a spring which, when the brake system is engaged, causes the brake arm to pivot upwards and the brake pad comes into contact with a rotating spindle or pulley. For example, the pulley may be attached to a lawn mower blade. The combination of the spring pivoting the brake arm upwards as well as the rotation of the pulley towards the brake arm causes the pulley to cease rotating, bringing the rotating member to a stop.

16 Claims, 14 Drawing Sheets

BRAKE ASSEMBLY FOR POWER EQUIPMENT

This application claims priority of U.S. provisional application 61/251,272 filed on Oct. 13, 2009 and is included herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to power equipment and more specifically to a brake assembly for stopping rotational parts in power equipment from turning.

2. Description of Related Art

Power equipment such as lawn mowers, snow blowers and the like utilize rotational energy to turn everything from mower blades to snow blower blades. As these blades are turning, grass is being cut or snow is directed out an exhaust chute. Bringing these rotational elements to a timely stop may be critical for safety.

In a common lawn mower design, a cutting blade typically extends away from a pulley which, via a drive belt, is connected to a crankshaft of an engine. When the pulley is engaged, the blades will turn. As the blades turn, grass is cut by the rotating blades. An ever common issue associated with the cutting blades is the application of an efficient means of stopping the blades from turning when necessary.

Previous methods and devices of stopping the turning mower blades have been disclosed, such as U.S. Pat. No. 6,464,055 issued to Wains. In Wains, a complex braking system is disposed radially around the spinning blades. The braking system applies braking pressure to various components which have many intricate parts. This system is rather complex and cumbersome to incorporate.

The present invention overcomes this complexity by disclosing a braking member that is activated by tension applying means and applies a braking pressure directly to the rotating pulley or other spinning device. The brake assembly of the present invention uses the rotational energy of the spinning device to apply braking pressure to the braking element. Once engaged, the brake assembly causes the spinning device to cease rotating which stops the blades from spinning.

SUMMARY OF THE INVENTION

A brake system for use in lawn cutting power equipment is disclosed. The brake system halts the rotational motion of a pulley. The pulley is connected with a lawn mower blade. The brake system has a brake pad connected to a brake arm at a first end. The brake arm has a second end which is connected to a base thus allowing the brake arm to pivot at the second end. The brake arm is connected to an engagement tension device and a disengagement tension device, the engagement tension device and the disengagement tension device are connected to the brake arm between the first end and the second end. The engagement tension device directs the brake towards the pulley into a first position. The disengagement tension device directs the brake away from the pulley to a second position, wherein the brake in the first position causes the rotation of the pulley to stop and the brake set in the second braking position does not hinder the rotational motion of the pulley.

A lawn mower for cutting grass is disclosed. The lawn mower has a blade assembly connected to a spindle which is in turn connected to a pulley. The brake system has a brake pad connected to a brake arm at a first end. The brake arm has a second end which is connected to a base, thus allowing the brake arm to pivot at the second end. The brake arm is connected to an engagement tension device and a disengagement tension device, the engagement tension device and the disengagement tension device are connected to the brake arm between the first end and the second end. The engagement tension device directs the brake towards the pulley into a first position. The disengagement tension device directs the brake away from the pulley to a second position, wherein the brake in the first position causes the rotation of the pulley to stop and the brake set in the second braking position does not hinder the rotational motion of the pulley.

A lawn mower for cutting grass is disclosed. The lawn mower has a mower deck and the mower deck has multiple blade assemblies. Each blade assembly has a blade connected to a spindle which is connected to a pulley and a brake system. The brake system is connected to at least one blade assembly. The brake system has a brake pad connected to a brake arm at a first end. The brake arm has a second end which is connected to a base, thus allowing the brake arm to pivot at the second end. The brake arm is connected to an engagement device and a disengagement device. The engagement device and the disengagement device are connected to the brake arm between the first end and the second end. The engagement device directs the brake towards the pulley into a first position. The disengagement device directs the brake away from the pulley to a second position, wherein the brake in the first position causes the rotation of the pulley to stop and the brake set in the second braking position does not hinder the rotational motion of the pulley.

DETAILED DESCRIPTION OF THE INVENTION

Figure 1:
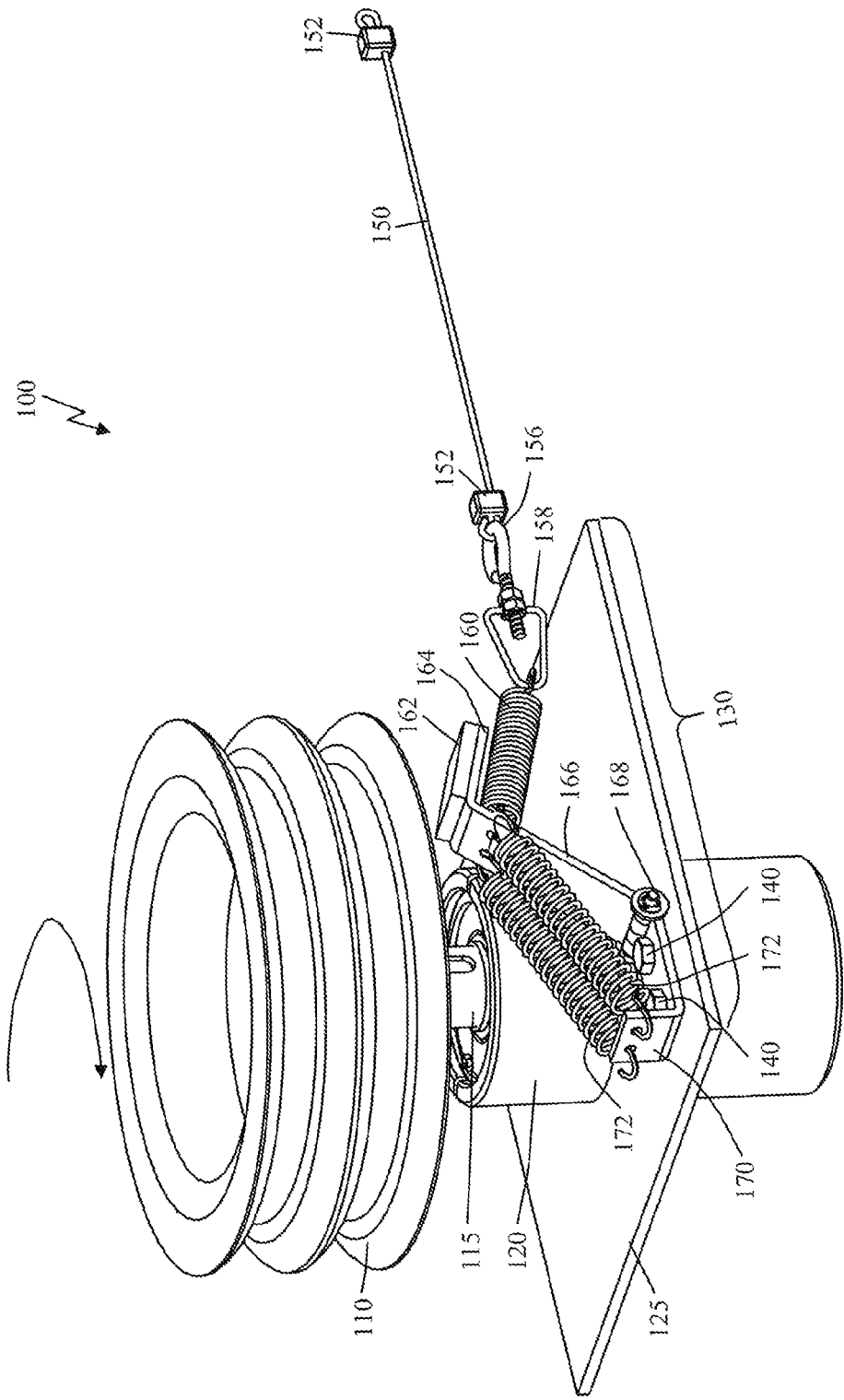
FIG. 1 displays a side perspective view of a brake assembly in accordance with one aspect of the present invention in a disengaged position.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a " or "an ", as used herein, are defined as one or as more than one. The term "plurality ", as used herein, is defined as two or as more than two. The term "another ", as used herein, is defined as at least a second or more. The terms "including " and/or "having ", as used herein, are defined as comprising (i.e., open language). The term "coupled ", as used herein, is defined as connected, although not necessarily directly, and not necessarily mechanically.

Reference throughout this document to "one embodiment ", "certain Embodiments ", and "an embodiment " or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or " as used herein is to be interpreted as an inclusive or meaning any one or any combination. Therefore, "A, B or C " means any of the following: "A; B; C; A and B; A and C; B and C; A, B and C ". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means " preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means " is not intended to be limiting.

FIG. 1 displays a side perspective view of lawn mower blade assembly 100 utilizing a brake assembly (herein after referred to as "brake ") 130 in accordance with one embodiment of the present invention. The lawn mower blade assembly 100 may be used in a variety of lawn care equipment from simple walk behind mowers to large commercial mowers. Common to all of these applications is the use of an engine to engage the lawn mower blade assembly 100. The blade (not shown for ease of illustration) is attached to the bottom of a spindle which is attached to the pulley.

As is shown in FIG. 1 and is described in greater detail in subsequent sections, the brake 130 is in a disengaged position. The mower blade assembly 100 has a pulley 110 upon which a belt (not shown) is attached. The belt couples the lawn mower blade assembly 100 with the output of the engine. There may be additional control devices or equipment that actively engages the belt driving the lawn mower blade assembly 100. In a walk behind mower this may be an operator presence system (OPS) that should be in an operable position in order to get the motor to run and the blades to turn. In this example, whenever the engine is running, grass cutting blades attached to the lawn mower blade assembly 100 are turning. Thus, when the kill switch is released, the engine is cut off and the blades eventually stop turning.

In larger lawn care equipment, such as a riding lawn mower or commercial grade lawn mower, a separate switch, release, lever or other type of mechanism may be used to deactivate the brake and engage the blades coupled to the lawn mower blade assembly 100. Thus, when the engine of a riding lawn mower is running and the brake assembly 130 is engaged, the blades are not turning. However, once the mechanism is activated, the lawn mower blade assembly 100 is activated, the brake 130 is disengaged and the blades turn. In a walk behind mower this may be an operator presence system (OPS) that should be in an operable position in order to get the motor to run and the blades to turn.

Stopping the lawn mower blades in a timely fashion is paramount for safety. Regulatory bodies such as ANSI (American National Standards Institute) have provided guidelines for stopping lawn mower blades when they are disengaged. For example, ANSI document ANSI B71.4-2004 states, "A means shall be provided that will automatically stop the implement/attachment after the operator deactivates the control. If stopping time exceeds seven (7) seconds, audible or visual indications of component movement shall be provided. Such means shall prevent the implement/attachment from operating unless the operator activates this means. If the operator returns to the operator's position before the implement/attachment has stopped, the implement/attachment may automatically resume operation."

Referring back to FIG. 1, the pulley 110 turns in a clockwise direction. The pulley 110 is attached to a spindle shaft 115 that extends axially away from the pulley 110 and through a ball bearing housing 120, through a chassis 125 and attaches to a lawn mower blade or blades (not shown for ease of illustration). The blade assembly 100 typically rotates at speeds between about 2,000 to 4,000 RPM (revolutions per minute) and varies depending on the type and size of lawn mower blade attached to the spindle shaft 115. Typically, the larger the lawn mower blade, the slower it will rotate. Alternatively, the speed of the lawn mower blade tip may be measured instead of the RPM of the pulley 110. For example, a maximum blade tip speed of about 19,000 ft/min is typical for commercial grade mowers. It is the intent of the present invention that the brake 130, once activated, will be able to stop the rotation of the blade assembly 100 within 7 seconds or less. However, this intent is not meant as a limitation of the inventive concepts and ideas as described.

When the pulley 110 is engaged by the engine and the brake 130 is disengaged, the blade assembly 100 would be coupled to the engine and the blade assembly 100 may turn freely. As can be seen in FIG. 1, a brake cable 150 has connectors 152 attached at either end. In one embodiment, the connector 152 positioned away from the brake 130 may attach to a lever, handle or other type of mechanism which may be controlled by the user of the lawn mowing equipment. On the other end, connector 152 attaches to an eyelet 156. In alternative embodiments, a cable clamp, a cable swedge, or cable fitting may be used to attach to the eyelet 156. Alternative to the brake cable 150, a rod may also be used.

In one exemplary embodiment, the eyelet 156 is threaded at one end. This allows the eyelet 156 to attach to an eyelet adjuster 158. Applied at the other end of the eyelet adjuster 158 is a disengaging member 160. In this embodiment a release spring may be the disengaging member 160. As can be seen in the illustration, the release spring is a coil spring. The disengaging member 160 is also connected to a brake arm 166. Positioned at one end of the brake arm 166 is a pivot point 168 and at the other end is a brake pad platform 164. Upon the brake pad platform 166 is positioned a brake pad 162. Exemplary materials that may be used as brake pads 162 may include, but are not limited to, Kevlar, Aramid Fiber, Asbestos and the like. The choice of brake pad material may hinge on the amount of wear that the brake pad is to endure, the cost of the material, and any environmental impacts the product may have, if any. The brake pad 162 may be affixed to the brake pad platform 164 by many different methods such as, but not limited to, glue, epoxy, welding, rivets or the like. One advantage of using a rivet is that when the brake pad has worn down enough to expose the rivet head, the friction between the rivet head and the surface of the pulley may cause an audible noise. This noise may be sufficient enough to allow the user to become aware of the wear of the brake pad 162 and replace the brake arm 166 and brake pad 162. Alternatively a "squealer" or other type of mechanism may be employed to create the audible noise.

Attached on the other side of the brake arm 166 is an engaging member 172. In the embodiment of FIG. 1, two engagement springs may be employed as the engaging member 172. As can be seen in the illustration, the engagement springs are coil springs. At one end, the engaging member 172 attach to the brake arm 166. The other end of the engaging member 172 attaches to a brake base 170 which is positioned upon the chassis 125.

When the brake 130 is disengaged, the brake pad 162 is not in contact with the underside of the pulley 110. The combination of the disengaging member 160 and the tensile force exerted on the cable 150 provides a force necessary to overcome the tensile force applied to the brake arm 166 from the engagement springs 172. In one embodiment, the user of the power equipment may have a brake lever (not shown for ease of illustration) that may move from a first position to a second position. The first position may correspond to disengaging the brake 130 and the second position may correspond to engaging the brake 130. As mentioned above, when the brake lever is in the first position, the brake lever may provide enough tensile force through the cable 150 to overcome the tensile strength of the engagement springs 172.

However, when the user moves the brake lever from the first position to the second position, the tensile force exerted through the cable 150 may decrease enough to allow the tensile strength of the engagement springs 172 to pivot the brake arm 166 around a pivot point 168 and move the brake pad 162 in an upwards direction. When the brake pad 162 comes into contact with the pulley 110, the combination of the tensile strength of the engagement springs 172 and the circular rotation of the pulley 110 against the pad causes sufficient friction to bring the rotation of the pulley 110 to a halt.

Figure 2:
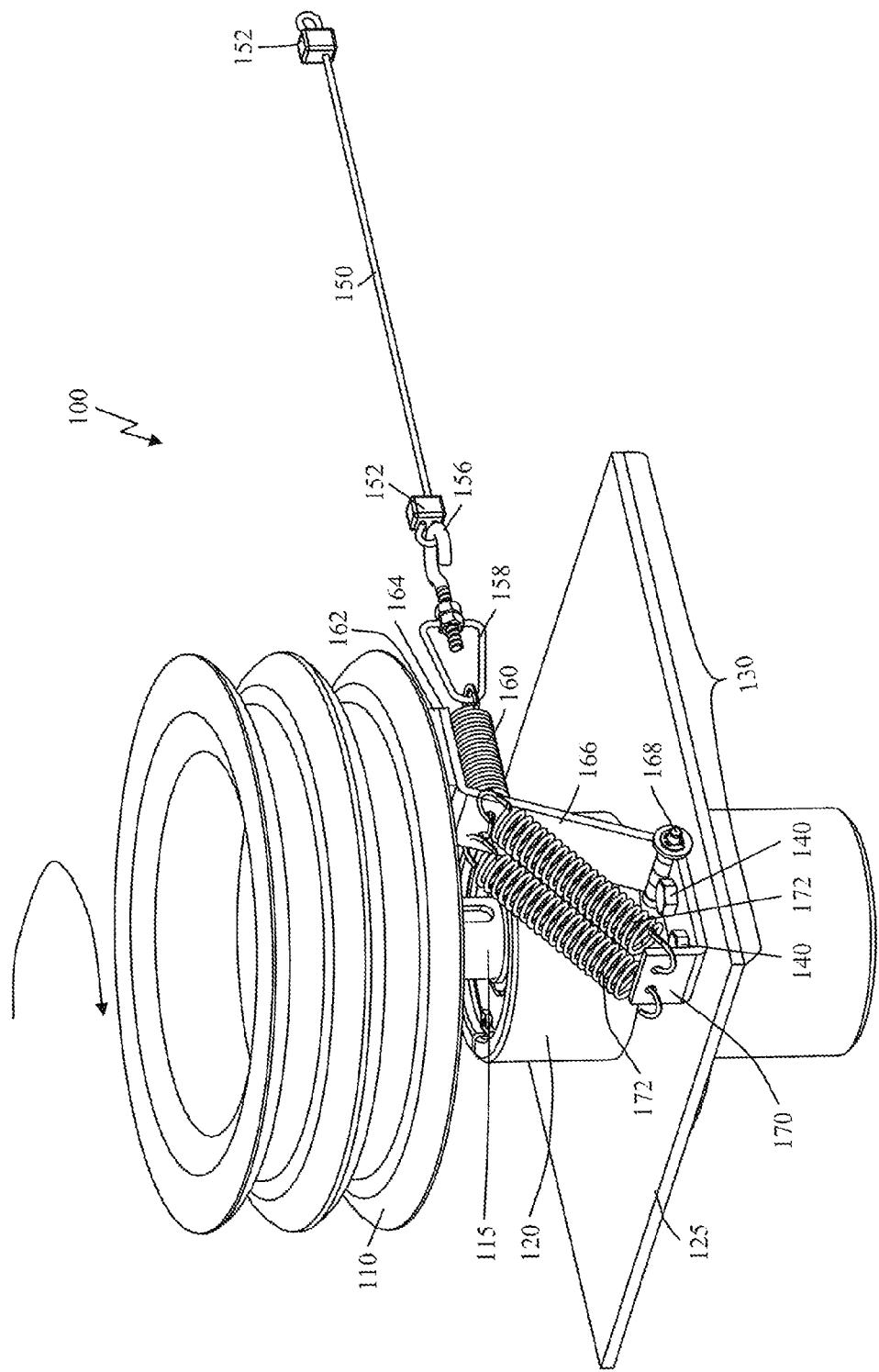
FIG. 2 displays a side perspective view of a brake assembly in accordance with one aspect of the present invention in an engaged position.

FIG. 2 shows the brake 130 engaged with the brake pad 162 pressed up against the underside of pulley 110. In this position, the brake pad 162 is being held against the pulley 110 by the tensile strength of the engagement springs 172. In addition, as shown in FIG. 2, the brake arm 166 is slightly angled. This is to take advantage of the rotational energy of the pulley 110 as it engages the brake pad 162. The rotational energy against the brake pad 162 tries to continue to rotate the brake arm 166 around the pivot point 168. This "wedges" the brake arm into place between the pivot point 168 and the pulley 110. In one exemplary embodiment, the angle 188 of the brake arm 166, and more specifically the brake pad platform 164 measured in relation to the pulley is about one hundred ten (110) degrees (see FIG. 3).

When selecting appropriate tensile strength of the engagement springs 172 and the tensile strength of the disengaging member 160, several factors may need to be taken into consideration. The height of the brake arm 166 is one factor. As the height of the brake arm 166 decreases the amount of force needed to move the brake arm may increase in order to maintain the same braking force.

In one embodiment, the tensile force of the engaging spring may be about 8 lbs/in each. In this embodiment, the characteristics of the engaging spring 172 may be as follows:
    a. wire diameter of the spring may be about 1.5 mm,
    b. an outside diameter of about 12.5 mm,
    c. relaxed length of about 54 mm,
    d. number of turns 20, and
    e. material may be 65Mn—metric standard.

In another embodiment, the tensile force of the release spring may be about 19 lbs/in In this embodiment, the characteristics of the release spring may be as follows:
    a. wire diameter of the spring may be about 2 mm,
    b. an outside diameter of about 13 mm,
    c. relaxed length of about 64 mm,
    d. number of turns 19, and
    e. material may be 65Mn—metric standard.

In yet another embodiment, the tensile force of the release spring may be about 24 lbs/in. In this embodiment, the characteristics of the release spring may be as follows:
    a. wire diameter of the spring may be about 1.5 mm,
    b. an outside diameter of about 11.5 mm,
    c. relaxed length of about 54 mm,
    d. number of turns 25, and
    e. material may be 65Mn—metric standard.

It is important to point out that in the embodiment of the brake 130 displayed in the illustrative figures, two engaging springs are shown as the engaging member 172. Alternatively, a single spring may be employed or multiple springs may be used.

Figure 3:
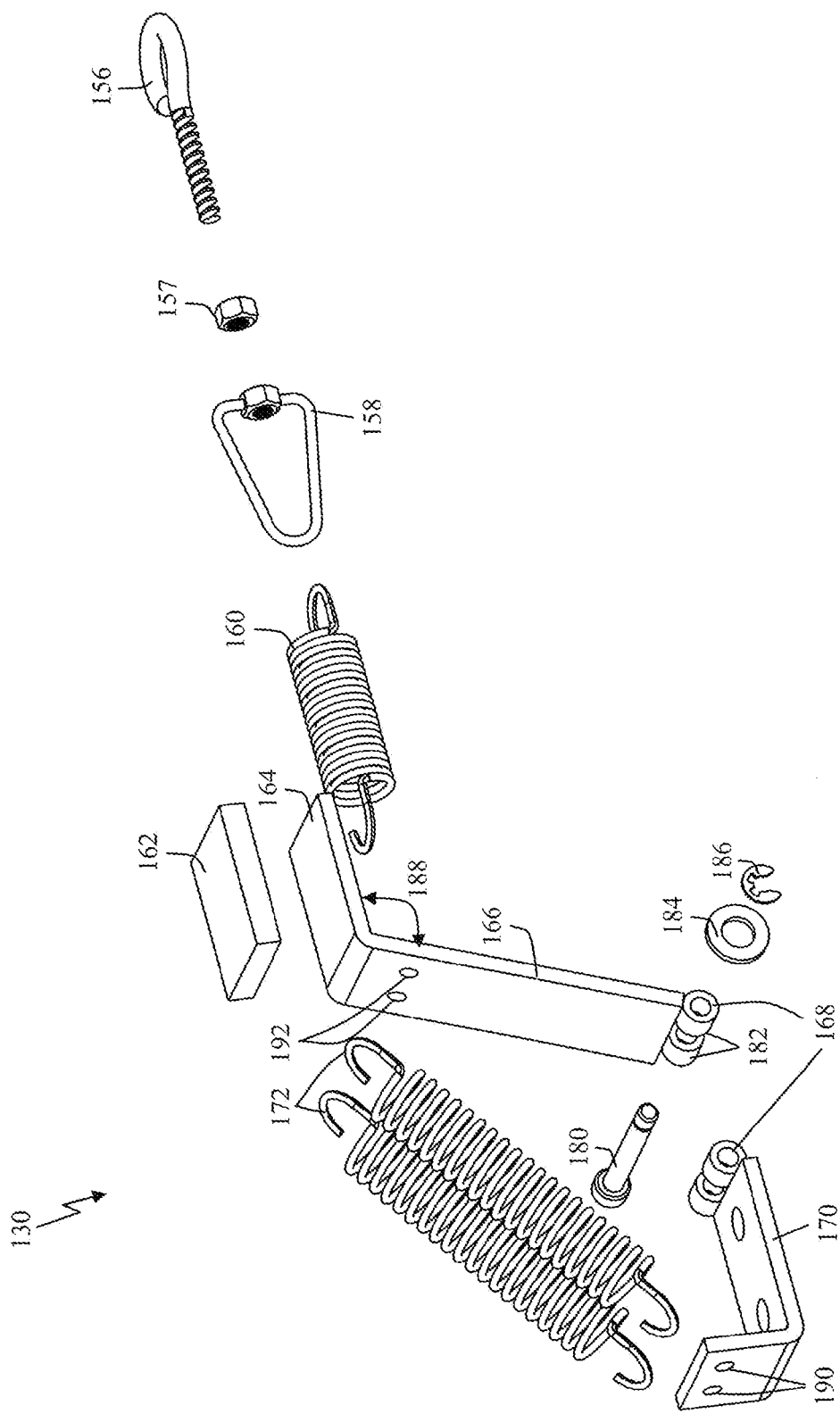
FIG. 3 displays an exploded view of the brake assembly of FIGS. 1 and 2.

FIG. 3 displays an exploded view of the various parts of the brake 130. The pivot point 168 of the brake has a securing member holding the brake arm into place. In the embodiment of FIG. 3, the securing member is a pivot pin 180 which passes through two eyelets 182 of the brake arm 166 when the brake arm 166 is attached to the base 170. Fastened at the end of the pivot pin 180 is a flat washer 184 and a retaining ring 186. The retaining ring 186 secures the pivot pin 180 into place. Instead of the pivot pin 180 and associated hardware, the securing member may be but not limited to a rivet, bolt, screw, pin, and the like.

In one embodiment, the engaging member 172 may attach to eyelets 190 on the base 170 and eyelets 192 on the brake arm 166. Similarly, the one end of the disengaging member 160 may attach to an eyelet (not shown) on the underside of the brake arm 166 and the other end to the eyelet adjuster 158. In alternative embodiments, the engaging member 172 may attach to protrusions on the base 170 and the brake arm 166. Similarly, the disengaging member 160 may also attach to a protrusion on the underside of the brake arm 166.

The brake pad 162 may vary in thickness. In one exemplary embodiment, the brake pad may be about 3 mm thick. In another embodiment the height of the brake pad 162 may be about 5 mm. Similar to wear indicators on automotive brakes, a wear indicator may also be implemented on the brake 130. Once the brake pad 162 has worn down to a predetermined level, a metal part (such as a rivet) may engage the pulley 110 and cause an audible noise. The audible noise may signify that the brake wear has reached a point where the brake pad 162 may need to be replaced. In this instance, it may be easier to replace the brake arm 166 rather than just the brake pad 162. The brake arm may be replaced by removing the various springs 160 and 172, the retaining ring 186 and sliding the pivot pin 180 out. A new brake arm 166 may then be secured in place and the parts put back in reverse order.

Figure 4:
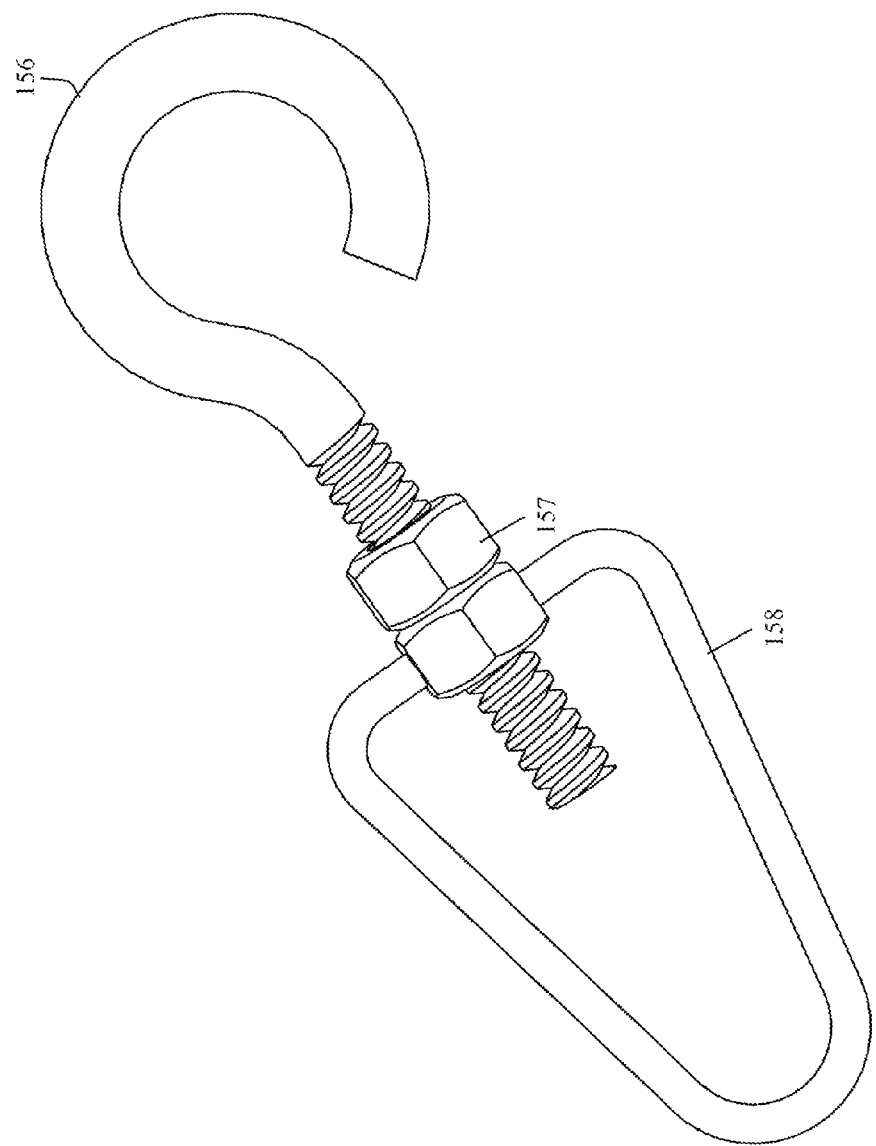
FIG. 4 shows an eyelet attached to an eyelet adjusted for a brake assembly in accordance with yet another aspect of the present invention.

FIG. 4 shows a close up view of the eyelet 156 when it is attached to the eyelet adjuster 158. The eyelet 156 is held into place by installing a jam nut 157 on the eyelet 156. Where on the eyelet 156 the eyelet adjuster 158 is positioned depends on several items which may include, but are not limited to, the length of the cable 150, the size (windings) of the various springs 160 and 172, the amount of travel the cable 150 is going to make and the amount of travel the brake lever is to make (see FIG. 3).

Figure 5:
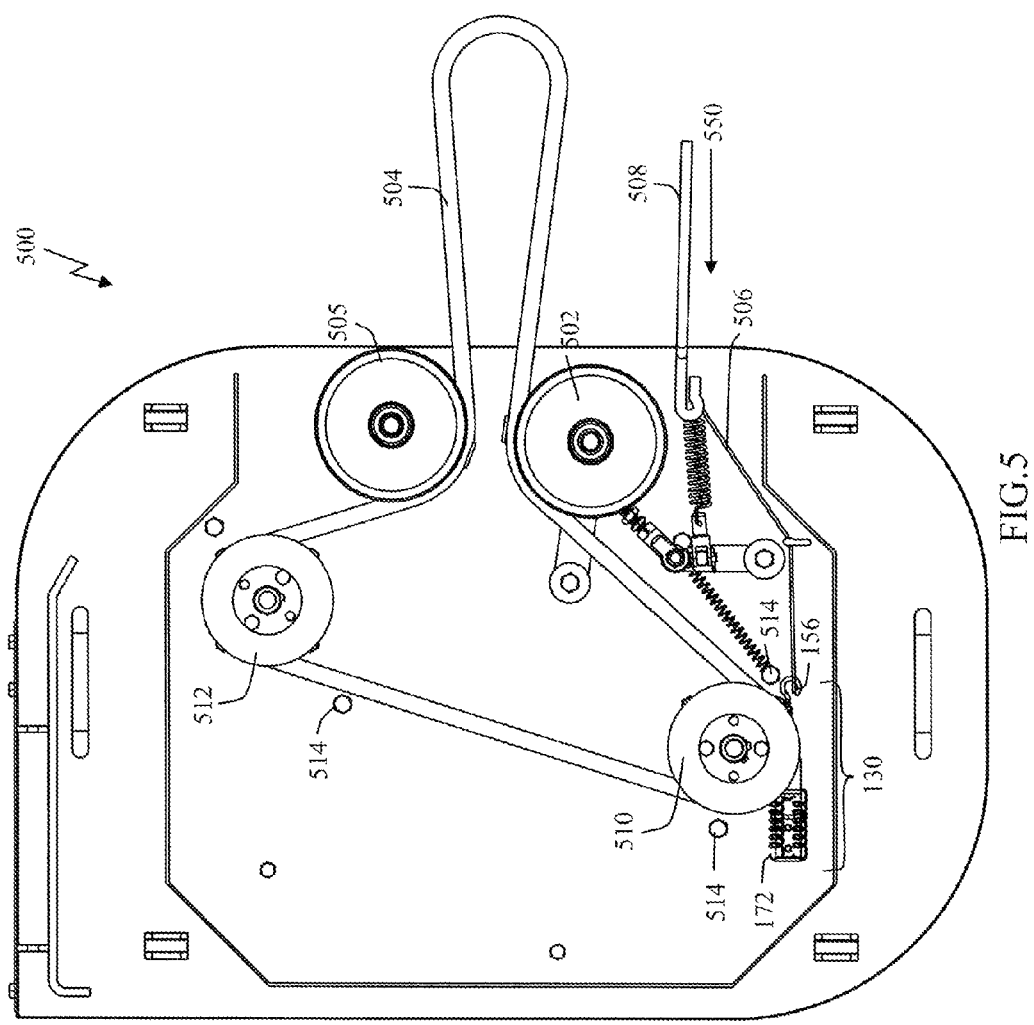
FIG. 5 shows a top view of a mower deck a single brake assembly installed.

FIG. 5 shows a top view of a mower deck 500 that has a brake 130 attached to blade assembly 510 in accordance with one embodiment of the present invention. The mower deck 500 has another blade assembly 512 positioned away from blade assembly 510. In the embodiment of FIG. 5, the blade assembly 510 and 512 are linked by drive belt 504. Belt guides 514 are positioned to keep the drive belt close to the blade assemblies 510 and 512. Attached to the eyelet 156 is a brake cable 506 which is attached to lever 508.

As shown in FIG. 5, the blade assemblies 510 and 512, are in the engaged position with the brake 130 in the disengaged position. To disengage the blade assembly 510 and engage the brake 130, the lever 508 is moved in a forward direction 550. The movement in the forward direction 550 simultaneously relaxes engaging pulley 502 (removing the driving force by the belt 504 on the blade assembly 510) and causes tension to be relieved on the disengaging member 160. Further, the tension in the engaging member 172 causes the brake arm 166 to pivot upwards causing the brake pad 162 to come into contact with the pulley on the blade assembly 510 (See FIG. 3).

Figure 6:
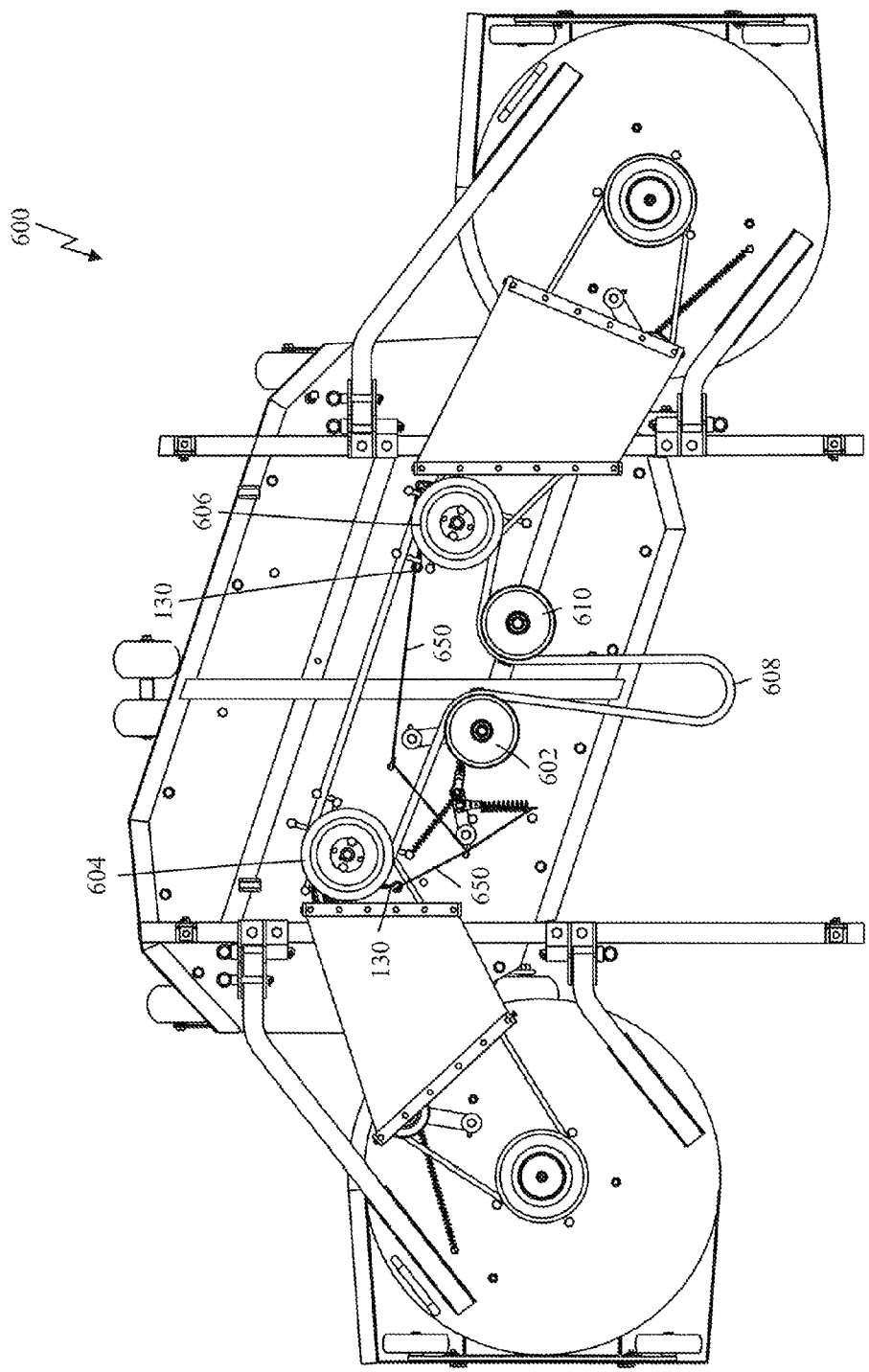
FIG. 6 shows a mower deck using two blade brake assemblies in accordance with another embodiment of the present invention.

FIG. 6 displays a top view of a tow behind mower 600 in accordance with another embodiment of the present invention. In this embodiment, multiple brakes 130 may be attached to multiple blade assemblies and linked by brake cable 650. In this instance two brakes 130 may be used in order to stop the blade assemblies 604 and 606 together. The mower 600 has an engaging pulley 602 and a guide pulley 610 which are connected via drive belt 608. Brake cable 650 connects the two brakes 130 and when engaged, the brakes 130 work in unison to stop blade assemblies 604 and 606. In this embodiment, two brakes 130 may be desired since the blade assemblies 604 and 606 may be engaged to the wing mowers by wing belts. The brakes 130 would not only have to stop the blades on blade assemblies 604 and 606 but the blades on the wing mowers as well.

Figure 7:
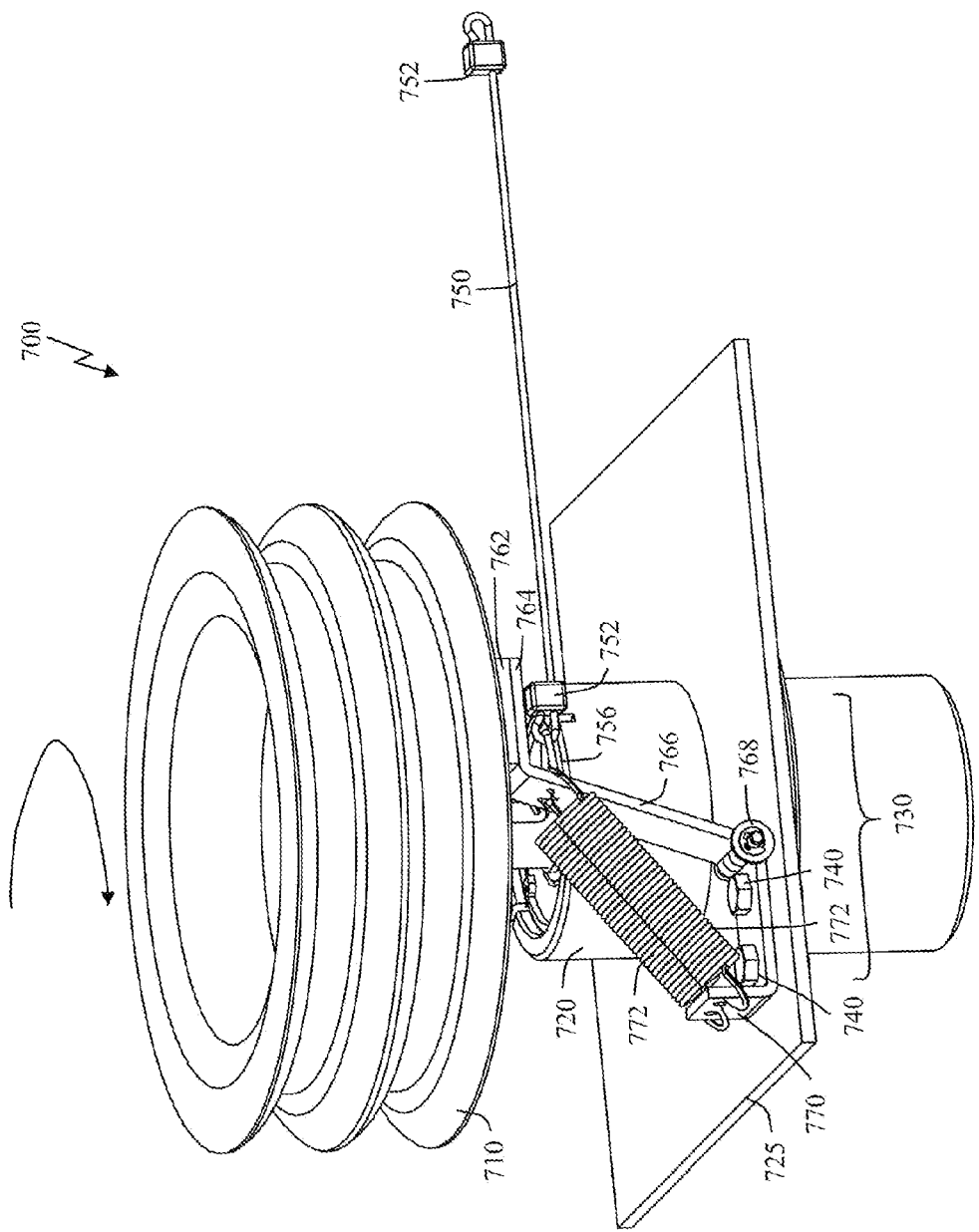
FIG. 7 displays a side perspective view of a brake assembly in accordance with another aspect of the present invention in an engaged position.

FIG. 7 displays another mower blade assembly 700 and brake 730 in accordance with another embodiment of the present invention. The mower blade assembly 700 has a pulley 710 upon which a belt (not shown) is attached. The belt couples the lawn mower blade assembly 700 with the output of an engine. There may be additional control devices or equipment that actively engages the belt, driving the lawn mower blade assembly 700. Whenever the engine is running, and the brake 730 is disengaged, grass cutting blades attached to the lawn mower blade assembly 700 are turning. The pulley 710 is attached to a spindle shaft that extends axially away from the pulley 710 and through a ball bearing housing 720, through a chassis 725 and attaches to a lawn mower blade or blades (not shown for ease of illustration.)

As can be seen in FIG. 7, a brake cable 750 has two connectors 752 attached at both ends. In one embodiment, the connector 752 not attached to the brake 730 may attach to a lever, handle or other type of mechanism which may be controlled by the user of the lawn mowing equipment. The connector 752 attaches to an eyelet 756 which in turn is connected to a brake arm 766.

Also attached to the brake arm is an engaging member 772. In the embodiment of FIG. 7, the engaging member 772 may be two springs. At one end, the engagement member 772 attaches to brake arm 766. The other end of the engagement member 772 attaches to brake base 770. The brake arm 766 pivots around pivot point 768 which is located at the base 770 on the chassis 725. The base 770 may be secured with bolts 740. Also attached to the brake arm 766 is a disengaging member. As can be seen in FIG. 7, the disengaging member may be the brake cable 750.

Positioned at the other end of the brake arm 766 away from pivot point 768 is a brake pad platform 764. Upon the brake pad platform 764 is positioned a brake pad 762. Similar to the previous embodiments, exemplary materials that may be used as brake pads 762 may include, but are not limited to, Kevlar, Aramid Fiber, Asbestos and the like. The choice of brake pad material may hinge on the amount of wear that the brake pad is to endure, the cost of the material, and any environmental impacts the product may have, if any. The brake pad 762 may be affixed to the brake pad platform 764 by many different methods such as, but not limited to, glue, epoxy, welding, rivets or the like. One advantage of using a rivet is that when the brake pad has worn down enough to expose the rivet head, the friction between the rivet head and the surface of the pulley may cause an audible noise.

When the brake 730 is disengaged, the brake pad 762 is not in contact with the underside of the pulley 710. The pulling force exerted by the cable 750 provides a force necessary to overcome the tensile force applied to the brake arm 766 from the engagement springs. In this embodiment, the operator may have a handle (not shown for ease of illustration) connected to the cable 750 that may be depressed in order to release the brake 730. When the handle is released, the pulling force exerted by the brake cable 750 is relieved and the engaging springs pull the brake arm 766 back towards the pulley 710 until the brake pad 762 makes contact with the underside of the pulley 710. When the brake 730 is engaged (i.e. the handle is released) the blades stop turning.

Figure 8:
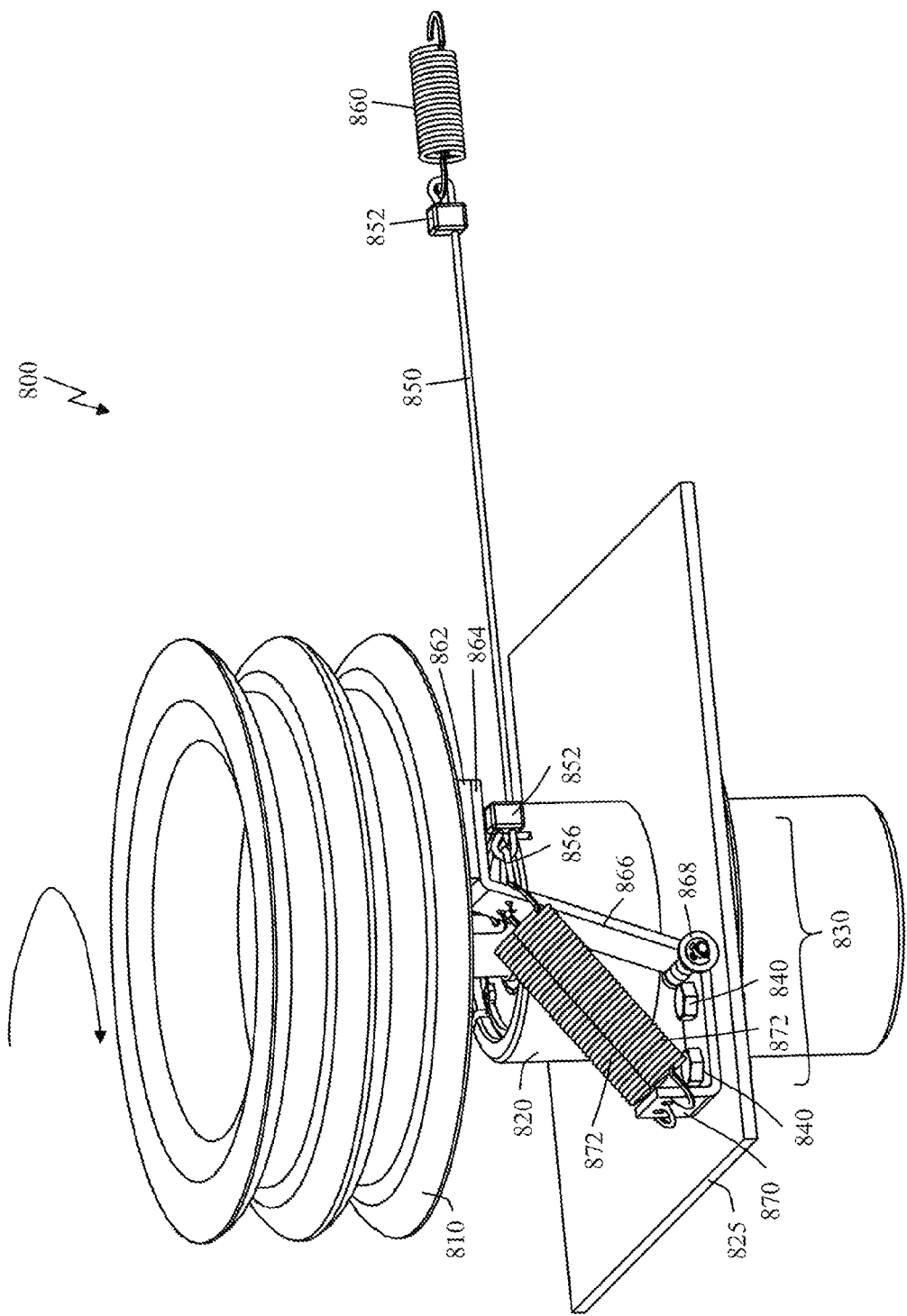
FIG. 8 displays a side perspective view of a brake assembly in accordance with yet another aspect of the present invention in an engaged position.

FIG. 8 displays a brake 830 in accordance with yet another embodiment of the present invention. The brake 830 is similar to the brake 730 of FIG. 7 with the addition of a release spring 860. Release spring 860 may be added to brake 830 in order to provide a smoother transition for the brake 830 as it transitions from an engaged position to disengaged position.

Mower blade assembly 800 has a pulley 810 upon which a belt (not shown) is attached. The belt couples the lawn mower blade assembly 800 with the output of an engine. There may be additional control devices or equipment that actively engages the belt, driving the lawn mower blade assembly 800. Whenever the engine is running and the brake 830 is disengaged, grass cutting blades attached to the lawn mower blade assembly 800 may be turning. The pulley 810 is attached to a spindle shaft that extends axially away from the pulley 810 and through a ball bearing housing 820, through a chassis 825 and attaches to a lawn mower blade or blades (not shown for ease of illustration).

As shown in FIG. 8, the brake 830 has a brake arm 866 which pivots at pivot point 868. A brake cable 850 has two connectors 852 attached at both ends. In one embodiment, the connector 852 not attached to the brake 830 may attach to the release spring 860 and the release spring 860 may attach to another cable and then to a lever, handle or other type of mechanism which may be controlled by the user of the lawn mowing equipment (not shown for ease of illustration). The connector 852 close to the brake arm 866 attaches to an eyelet 856 which in turn is connected to a brake arm 866.

Also attached to the brake arm is an engaging member 872. In the embodiment of FIG. 8, the engaging member 872 may be two springs. At one end, the engaging member 872 attaches to brake arm 866. The other end of the engaging member 872 attaches to brake base 870. The brake arm 866 pivots around pivot point 868 which is located at the base 870 on the chassis 825. The base 870 may be secured with bolts 840. Also attached to the brake arm 866 is a disengaging member. As can be seen in FIG. 8, the disengaging member may be the brake cable 850.

Positioned at the other end of the brake arm 866 away from pivot point 868 is a brake pad platform 864. Upon the brake pad platform 864 is positioned a brake pad 862. Similar to the previous embodiments, exemplary materials that may be used as brake pads 862 may include, but are not limited to, Kevlar, Aramid Fiber, Asbestos and the like. The choice of brake pad material may hinge on the amount of wear that the brake pad is to endure, the cost of the material, and any environmental impacts the product may have, if any. The brake pad 862 may be affixed to the brake pad platform 864 by many different methods such as, but not limited to, glue, epoxy, welding, rivets or the like. One advantage of using a rivet is that when the brake pad has worn down enough to expose the rivet head, the friction between the rivet head and the surface of the pulley may cause an audible noise.

When the brake 830 is disengaged, the brake pad 862 is not in contact with the underside of the pulley 810. The pulling force exerted by the cable 850 and release spring 860 provides a force necessary to overcome the tensile force applied to the brake arm 866 from the engagement springs. In this embodiment, the operator may have a handle coupled by a cable (not shown for ease of illustration) connected to the release spring 860 that may be depressed in order to release the brake 830. When the handle is released, the pulling force exerted by the brake cable 850 is relieved and the engaging springs pull the brake arm 866 back towards the pulley 810 until the brake pad 862 makes contact with the underside of the pulley 810. When the brake 830 is engaged (i.e. the handle is released) the blades stop turning.

Figure 9:
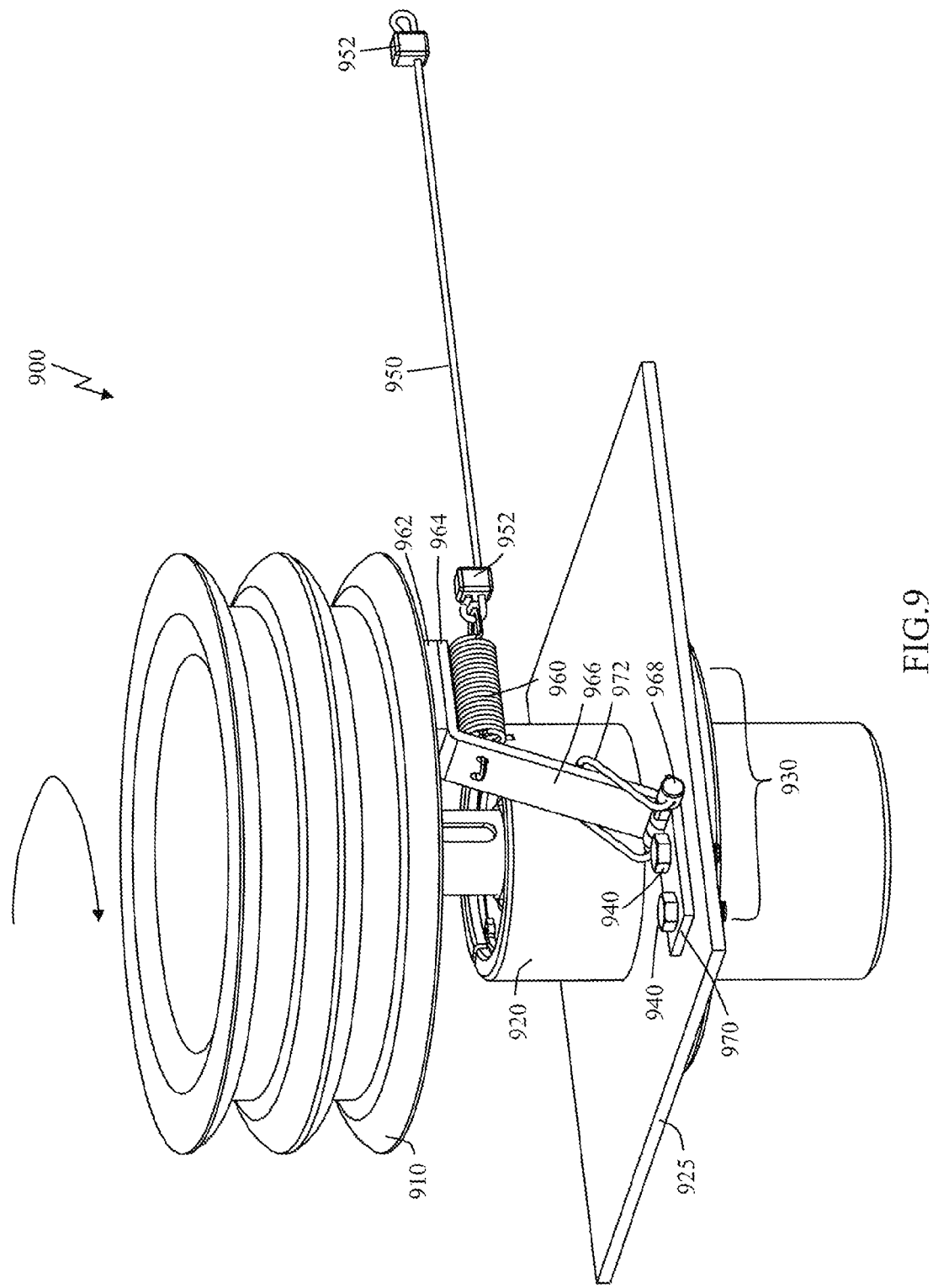
FIG. 9 displays a side perspective view of a brake assembly in accordance with another aspect of the present invention in an engaged position.

FIG. 9 displays a brake 930 in accordance with another embodiment of the present invention. As shown in FIG. 9, the brake 930 has a brake arm 966 which pivots at pivot point 968. A brake cable 950 has two connectors 952 attached at both ends. In one embodiment, the connector 952 not attached to the brake 930 may attach to a lever, handle or other type of mechanism which may be controlled by the user of the lawn mowing equipment. The other connector 952 attaches to a disengaging member 960 which in turn is connected to a brake arm 966.

Also in contact with the brake arm 966 is an engaging member 972. In the embodiment of FIG. 9, the engaging member 972 may be a torsion spring. The torsion spring may be similar in function to the torsion springs used in mouse traps. The torsion spring is configured to direct the brake arm 966 to pivot up away from the chassis 925 towards the pulley 910. The brake arm is pivoting from base 970 on the chassis 925. The base 970 may be secured with bolts 940. Also attached to the brake arm 966 is a disengaging member 960. As can be seen in FIG. 9, the disengaging member may be a spring attached to the brake cable 950.

Positioned at the other end of the brake arm 966 away from pivot point 968 is a brake pad platform 964. Upon the brake pad platform 964 is positioned a brake pad 962. Similar to the previous embodiments, exemplary materials that may be used as brake pads 962 may include, but are not limited to, Kevlar, Aramid Fiber, Asbestos and the like. The choice of brake pad material may hinge on the amount of wear that the brake pad is to endure, the cost of the material, and any environmental impacts the product may have, if any. The brake pad 962 may be affixed to the brake pad platform 964 by many different methods such as, but not limited to, glue, epoxy, welding, rivets or the like. One advantage of using a rivet is that when the brake pad has worn down enough to expose the rivet head, the friction between the rivet head and the surface of the pulley may cause an audible noise.

When the brake 930 is disengaged, the brake pad 962 is not in contact with the underside of the pulley 910. The tensile force exerted by the cable 950 and spring 960 provides a force necessary to overcome the torsion force applied to the brake arm 966 from the torsion spring. In this embodiment, the operator may have a handle (not shown for ease of illustration) that may be depressed in order to release the brake 930. When the handle is released, the tensile force exerted by the brake cable 950 is relieved and the torsion spring pulls the brake arm 966 back towards the pulley 910 until the brake pad 962 makes contact with the underside of the pulley 910.

Figure 10:
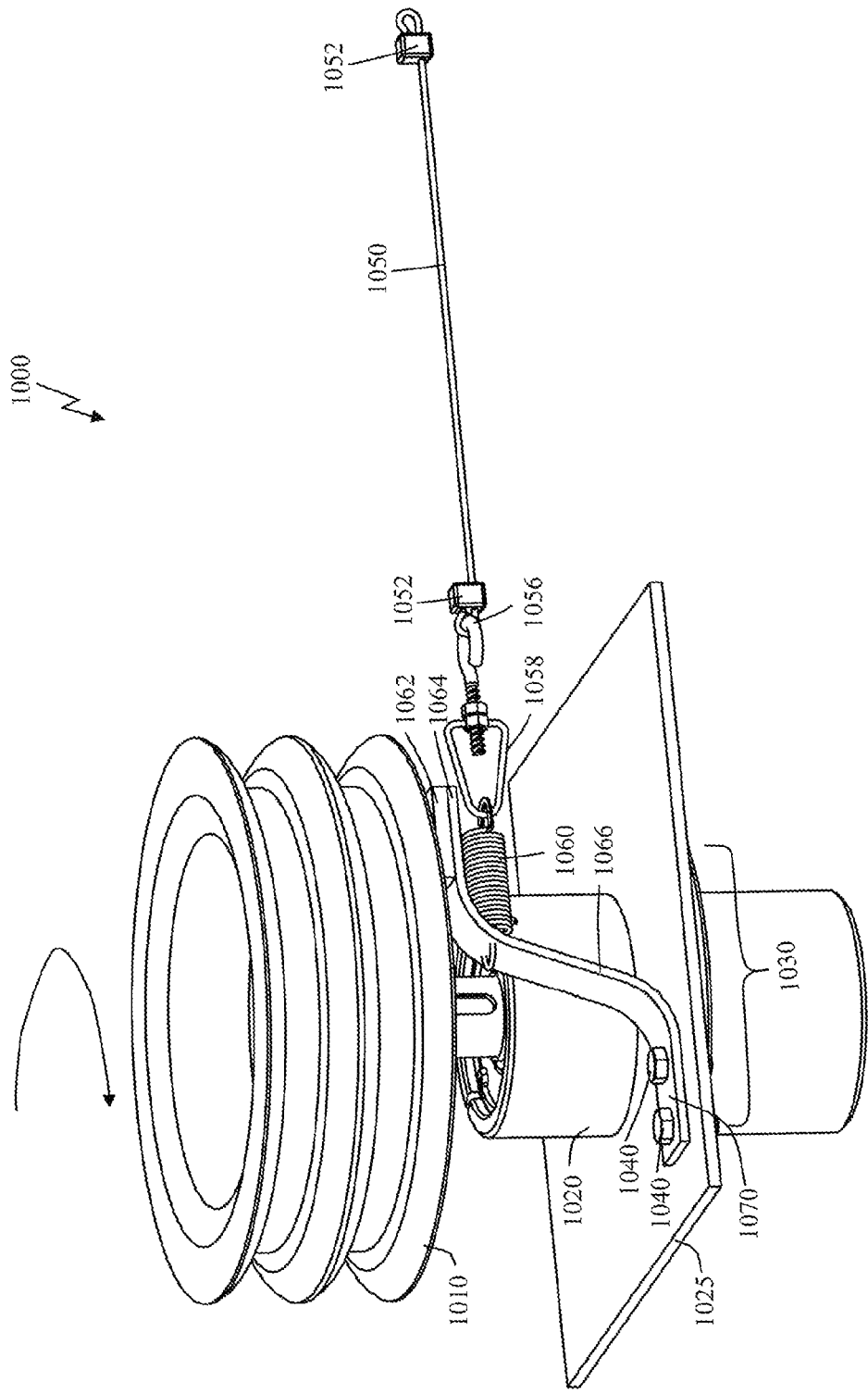
FIG. 10 displays a side perspective view of a brake assembly in accordance with another aspect of the present invention in an engaged position.

FIG. 10 displays a brake 1030 in accordance with a further embodiment of the present invention. In contrast to the previously described brake arms in the previous figures, brake arm 1066 itself has tensile properties. As pictured in FIG. 10, the brake arm 1066 is in a resting position. When in the resting position, the flexural force of the brake arm 1066 causes brake pad 1062 to press up against pulley 1010. One end of the brake arm 1066 has a base 1070 which is affixed to chassis 1025. The base 1070 may be secured with bolts 1040. Also attached to the brake arm 1066 is a disengaging member 1060. As can be seen in FIG. 10, the disengaging member may be a spring attached to the brake cable 1050. At the other end of the brake arm 1066 is a brake pad platform 1064. Upon the brake pad platform 1064 is positioned a brake pad 1062.

The brake cable 1050 has two connectors 1052 attached at both ends. In one embodiment, the connector 1052 may attach to a lever, handle or other type of mechanism which may be controlled by the user of the lawn mowing equipment. The other connector 1052 attaches to an eyelet 1056. In alternative embodiments, a cable clamp, a cable swedge, or cable fitting may be used to attach to the eyelet 1056. Alternative to the brake cable 1050, a rod may also be used.

In one exemplary embodiment, the eyelet 1056 is threaded at one end. This allows the eyelet 1056 to attach to an eyelet adjuster 1058. Applied at the other end of the eyelet adjuster 1058 is a disengaging member 1060. In this embodiment, a release spring may be the disengaging member 1060. The release spring is also connected to a brake arm 1066. In an alternative embodiment, the disengaging member 1060 may be the brake cable 1050 and no spring may be used.

In the example of FIG. 10, the brake arm 1066 is composed of sufficient flexible material to allow the brake arm 1066 to move to a disengaged position when the brake cable 1050 is pulled. When the brake cable is pulled in a downward direction, it will cause the brake arm to flex downwards moving the brake pad 1062 away from the pulley 1010. Releasing the brake pad from making contact with the pulley 1010 will allow the pulley to rotate as shown by the directional arrow in FIG. 10. As the pulley 1010 rotates, mower blades connected thereto begin to rotate.

In an alternative embodiment similar to FIG. 10, the brake arm may be positioned such that when the brake arm is in its un-flexed position it is not making contact with the pulley. When the brake is engaged, an engaging force may be applied to the brake arm to cause the brake arm to flex towards the pulley and the brake pad would make contact with the underside of pulley.

Figure 11:
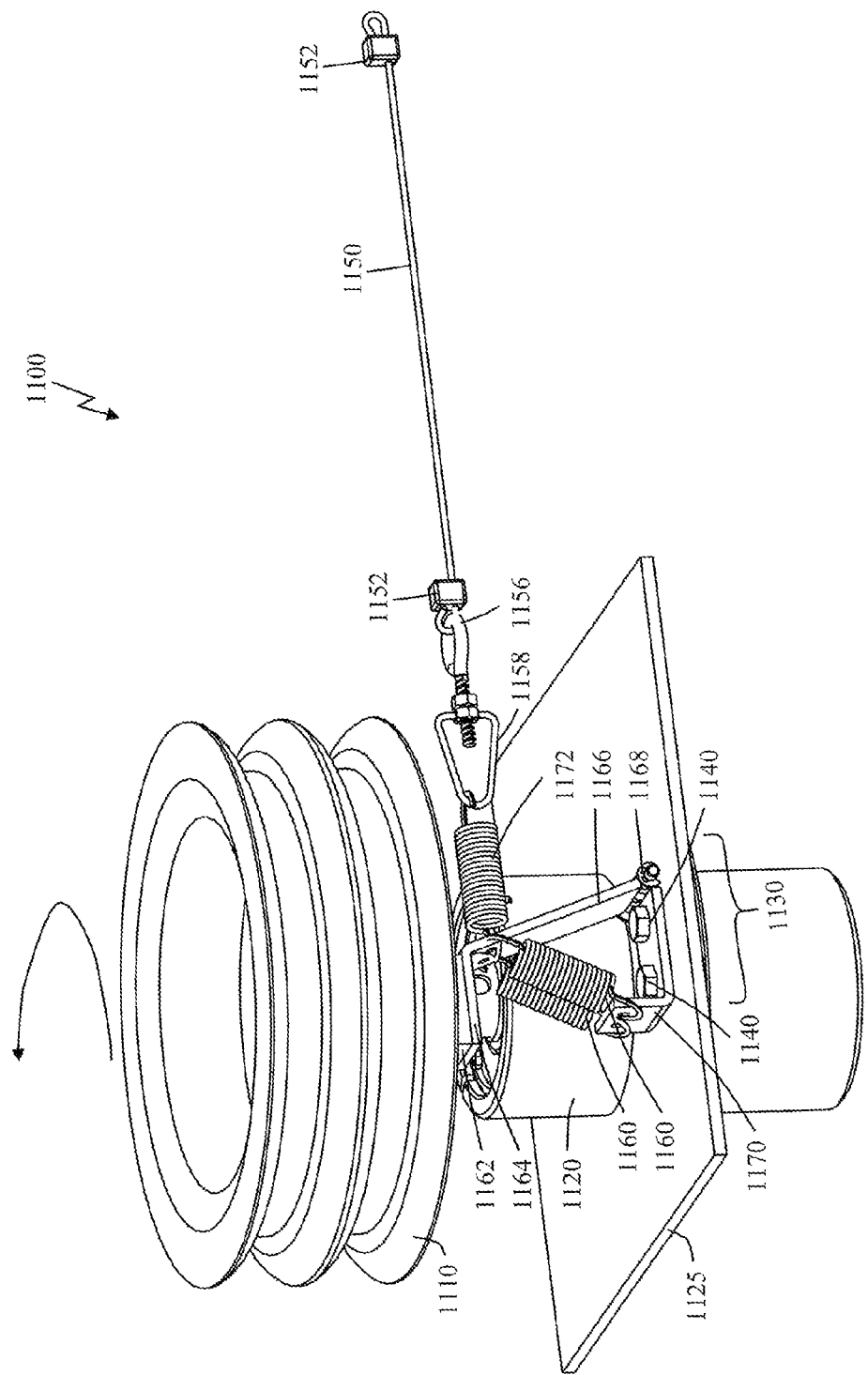
FIG. 11 displays a side perspective view of a brake assembly in accordance with another aspect of the present invention in an engaged position.

FIG. 11 displays a brake 1130 in accordance with another embodiment of the present invention. As shown in FIG. 11, the brake 1130 has a brake arm 1166 which pivots around a pivot point 1168. The pivot point 1168 may be attached to a base 1170 which is affixed to chassis 1125 by bolts 1140. Also attached to the brake arm 1166 is a disengaging member 1160. As can be seen in FIG. 11, the disengaging member may be a pair of springs attached to the brake arm 1166 and the base 1170. At the other end of the brake arm 1166 is a brake pad platform 1164. Upon the brake pad platform 1164 is positioned a brake pad 1162.

The brake cable 1150 has two connectors 1152 attached at both ends. In one embodiment, the connector 1152 may attach to a lever, handle or other type of mechanism which may be controlled by the user of the lawn mowing equipment. The other connector 1152 attaches to an eyelet 1156. In alternative embodiments, a cable clamp, a cable swedge, or cable fitting may be used to attach to the eyelet 1156. Alternative to the brake cable 1150, a rod may also be used.

In one exemplary embodiment, the eyelet 1156 is threaded at one end. This allows the eyelet 1156 to attach to an eyelet adjuster 1158. Applied at the other end of the eyelet adjuster 1158 is an engaging member 1172. In this embodiment a spring may be the engaging member 1172. The spring is also connected to a brake arm 1166. In an alternative embodiment, the engaging member 1172 may be the brake cable 1150 and no spring may be used.

In contrast to the brake 130 of FIGS. 1 and 2, the brake 1130 would engage when the brake cable 1150 is pulled. As discussed with regards to FIG. 1, when the brake cable 150 is pulled, the brake 130 is disengaged and the mower blades are allowed to rotate freely. Similarly, when the brake 1130 is disengaged, the brake pad 1162 is not in contact with the underside of the pulley 1110. The combination of the spring 1172 and the tensile force exerted by the cable 1150 provides a force necessary to overcome the tensile force applied to the brake arm 1166 from the springs 1060.

Figure 12:
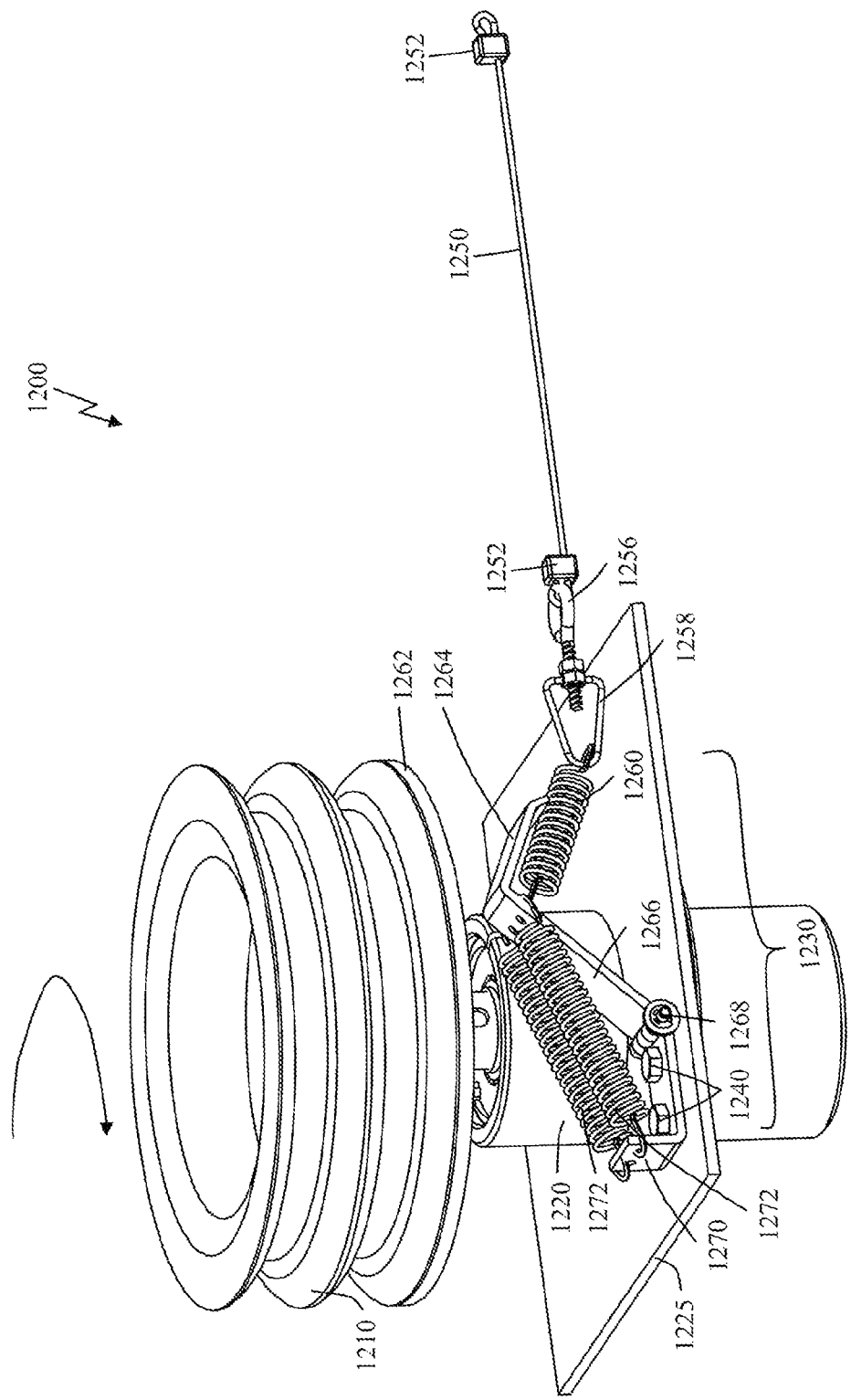
FIG. 12 displays a side perspective view of a brake assembly in accordance with one aspect of the present invention in a disengaged position.

FIG. 12 displays a brake 1230 in accordance with yet another embodiment of the present invention. As shown in FIG. 12, the brake 1230 has a brake arm 1266. One end of the brake arm 1266 has a base 1270 which is affixed to chassis 1225. The base 1270 may be secured with bolts 1240. Also attached to the brake arm 1266 is a disengaging member 1260. The disengaging member 1260 may be a spring attached to the brake cable 1250. At the other end of the brake arm 1266 is a brake pad platform 1264. The brake 1230 is similar to the brake 130 of FIG. 1 with the exception that brake pad material 1262 is located on the underside of the pulley 1210. In this embodiment, when the brake arm 1266 is pulled by the engaging member 1272 upwards, the brake pad platform 1264 comes into contact with the brake pad 1262 on the bottom side of the pulley 1210.

The brake cable 1250 has two connectors 1252 attached at both ends. In one embodiment, the connector 1252 may attach to a lever, handle or other type of mechanism which may be controlled by the user of the lawn mowing equipment. The other connector 1252 attaches to an eyelet 1256. In alternative embodiments, a cable clamp, a cable swedge, or cable fitting may be used to attach to the eyelet 1256. Alternative to the brake cable 1250, a rod may also be used.

In one exemplary embodiment, the eyelet 1256 is threaded at one end. This allows the eyelet 1256 to attach to an eyelet adjuster 1258. Applied at the other end of the eyelet adjuster 1258 is a disengaging member 1260. In this embodiment a release spring may be the disengaging member 1260. The release spring is also connected to a brake arm 1266. In an alternative embodiment, the disengaging member 1260 may be the brake cable 1250 and no spring may be used.

Figure 13:
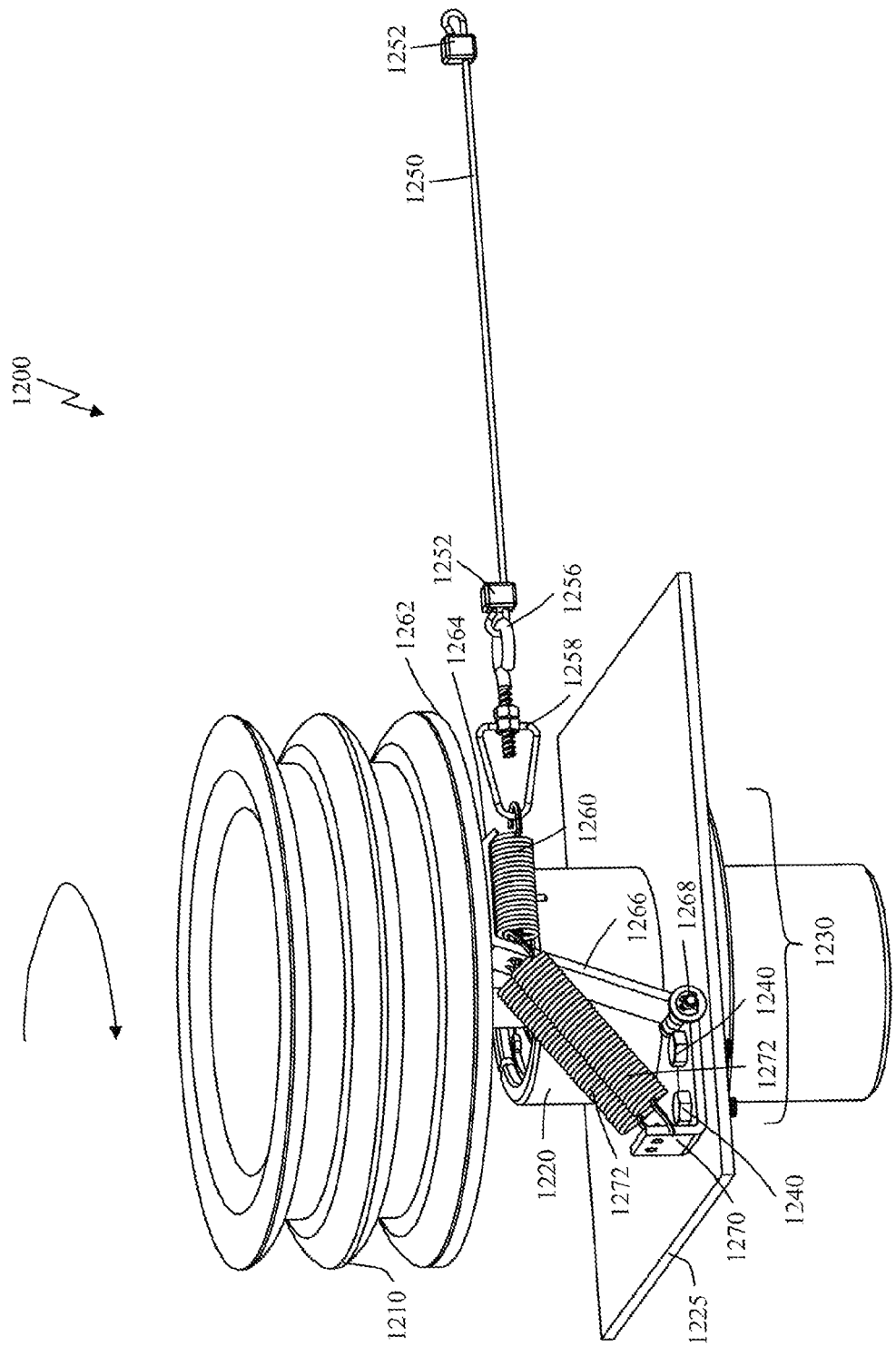
FIG. 13 displays a side perspective view of the brake assembly of FIG. 12 in an engaged position.

FIG. 13 displays the brake 1230 in an engaged position with the brake pad platform 1264 in contact with the brake pad material 1262.

Figure 14:
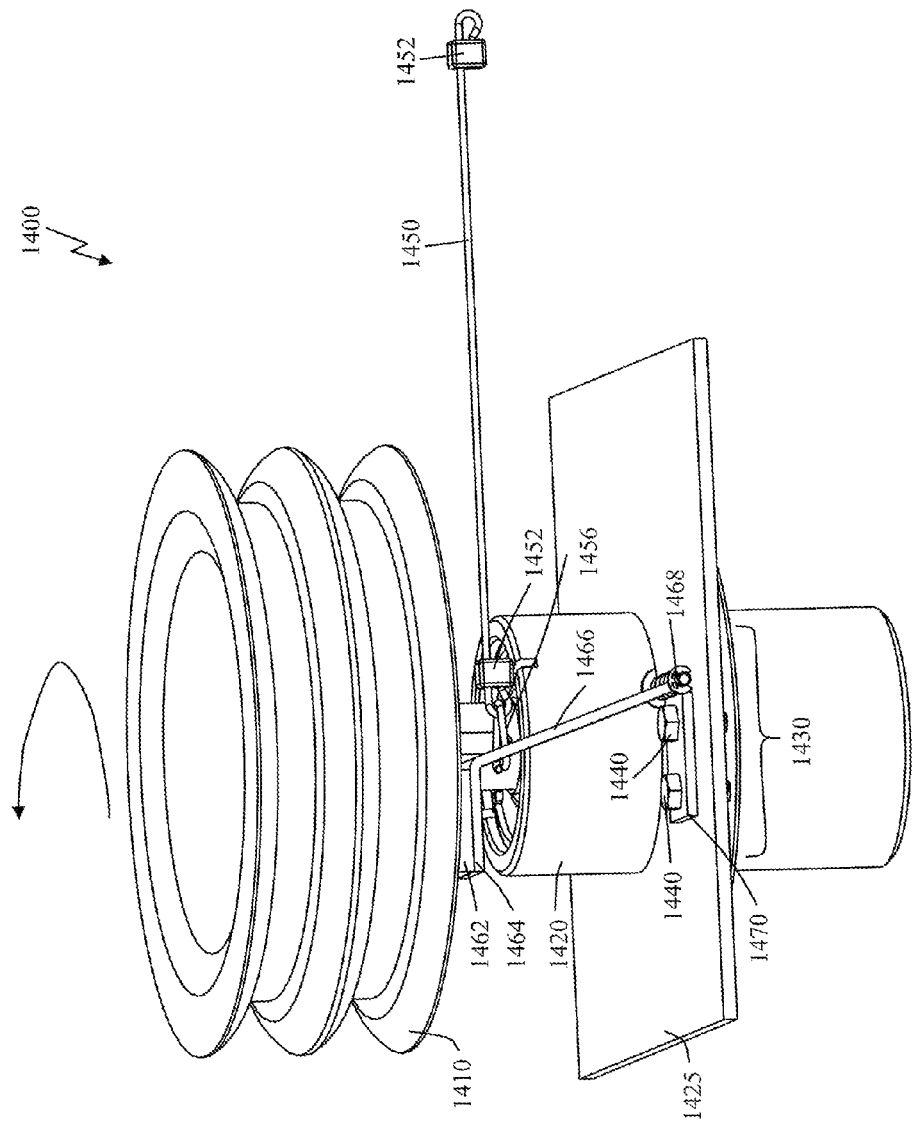
FIG. 14 displays a side perspective view of a brake assembly in accordance with another aspect of the present invention in an engaged position.

FIG. 14 displays a brake 1430 in accordance with another embodiment of the present invention. As shown in FIG. 14, the brake 1430 has a brake arm 1466 which pivots around a pivot point 1468. The pivot point 1468 may be attached to a base 1470 which is affixed to chassis 1425 by bolts 1440. Also attached to the brake arm 1466 is an engaging member 1450. As can be seen in FIG. 14, engaging member may be a brake cable. At the other end of the brake arm 1466 is a brake pad platform 1464. Upon the brake pad platform 1464 is positioned a brake pad 1462.

The engaging member 1450 has two connectors 1452 attached at both ends. In one embodiment, the connector 1452 may attach to a lever, handle or other type of mechanism which may be controlled by the user of the lawn mowing equipment. The other connector 1452 attaches to the brake arm 1466.

In the embodiment of FIG. 14, when tension applied by the engaging member 1450 is released, the brake arm 1466 may rotate in a downward direction. The rotation of the brake arm 1466 may be caused by gravity. When the operator wants to engage the brake 1430, the operator may pull a lever which in turn causes tension in the engaging member 1450. When tension is exerted against the brake arm, the brake arm pivots in an upward direction causing the brake pad 1462 to come in contact with the underside of the pulley 1410.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A brake system for use in stopping rotational movement of a rotating member in a piece of power equipment, the rotating member having an underside, the brake system comprising:
   a) a brake arm having a first end and a pivoting end;
   b) a brake pad affixed to the first end, the pivoting end connected to a base affixed to the piece of power equipment and positioned below the underside of the rotating member allowing the brake arm to pivot at the pivoting end, the brake arm coupled with an engaging member and a disengaging member, the engaging member and the disengaging member positioned on the brake arm between the brake pad and the pivoting end, c) wherein the engaging member directing the brake arm upwards towards the underside of the rotating member into a first position, the disengaging member directing the brake arm downwards away from the underside of the rotating member to a second position, wherein the brake arm in the first position causes brake pad to come into contact with the underside of the rotating member stopping the rotation of the rotating member, and the brake arm in the second position does not hinder the rotational motion of the rotating member.

2. The brake system of claim 1 wherein the brake the engaging member is a spring.

3. The brake system of claim 1 wherein the brake the engaging member is a cable.

4. The brake system of claim 1 wherein the brake the disengaging member is a spring.

5. The brake system of claim 1 wherein the brake pad is composed of aramid fiber.

6. The brake system of claim 1 wherein there is wear indicator to indicate an amount of brake pad remaining.

7. The brake system of claim 6 wherein the wear indicator cause an audible noise when the brake assembly is engaged.

8. A lawn mower comprising:

a) a blade assembly having a blade coupled to a spindle coupled to a pulley and a brake assembly coupled to the pulley, the pulley having an underside the brake assembly further comprising;

b) a brake pad affixed to a brake arm at a first end, the brake arm having a pivot end, the pivot end connected to a base affixed to the lawnmower and positioned below the underside of the pully to allow the brake arm to pivot at the pivot end, the brake arm coupled with an engaging member and a disengaging member, the engaging member and the disengaging member positioned on the brake arm between the brake pad and the pivot end, c) wherein the engaging member directing the brake arm towards the underside of the pulley into an engaged position, the disengaging member directing the brake arm downwards away from the underside of the pulley to a disengaged position, where the brake arm in the engaged position causes rotation of the pulley to stop and the brake arm set in the disengaged position allows the pulley to rotate when the pulley is rotated by a drive belt connected to the pulley.

9. The lawn mower of claim 8 wherein the engaging member is a spring.

10. The lawn mower of claim 8 wherein the disengaging member is a spring.

11. The lawn mower of claim 9 wherein the spring is a spiral spring.

12. The lawn mower of claim 9 wherein the spring is a torsion spring.

13. The lawn mower of claim 8 wherein the brake pad is Kevlar® aramid fiber.

14. The lawn mower of claim 8 wherein the brake pad is aramid fiber.

15. The lawn mower of claim 8 further comprising wear indicators to indicate an amount of brake pad remaining.

16. The lawn mower of claim 15 wherein the wear indicators cause an audible noise when the brake assembly is engaged.

* * * * *

UNITED STATES PATENT AND TRADEMARK OFFICE
CERTIFICATE OF CORRECTION

PATENT NO. : 8,713,903 B2
APPLICATION NO. : 12/728433
DATED : May 6, 2014
INVENTOR(S) : Jackson et al.

Page 1 of 1

It is certified that error appears in the above-identified patent and that said Letters Patent is hereby corrected as shown below:

In the Claims

Col. 13, Claim 2, Line 1 should read --
2. The brake system of claim 1 wherein "the brake" the engaging member is a spring.

Col. 13, Claim 3, Line 1 should read --
3. The brake system of claim 1 wherein "the brake" the engaging member is a cable.

Col. 13, Claim 4, Line 1 should read --
4. The brake system of claim 1 wherein "the brake" the disengaging member is a spring.

Signed and Sealed this
Seventeenth Day of February, 2015

Michelle K. Lee
*Deputy Director of the United States Patent and Trademark Office*